United States Patent [19]

Szerlip

[11] Patent Number: 4,980,878

[45] Date of Patent: Dec. 25, 1990

[54] METHOD AND APPARATUS FOR SCANNING A RECORDING MEDIUM FOR DEFECTS

[75] Inventor: Stanley R. Szerlip, Panorama City, Calif.

[73] Assignee: Discovision Associates, Costa Mesa, Calif.

[21] Appl. No.: 782,165

[22] Filed: Oct. 2, 1985

Related U.S. Application Data

[60] Continuation of Ser. No. 230,920, Feb. 2, 1981, abandoned, which is a division of Ser. No. 45,112, Jun. 4, 1979, abandoned.

[51] Int. Cl.$^5$ .......................... G11B 27/36; G11B 7/08
[52] U.S. Cl. .......................................... 369/54; 369/58
[58] Field of Search ............... 369/53, 54, 58; 360/25, 360/27, 38

[56] References Cited

U.S. PATENT DOCUMENTS

| | | | |
|---|---|---|---|
| 2,937,368 | 5/1960 | Newby | 360/25 |
| 3,217,111 | 11/1965 | Namenyi-Katz | 360/25 |
| 3,365,706 | 1/1968 | King | 369/48 |
| 3,657,707 | 4/1972 | McFarland et al. | 365/127 |
| 3,761,905 | 9/1973 | Hollstein, Jr. et al. | 360/25 |
| 3,790,755 | 2/1974 | Silverman | 360/84 |
| 3,997,876 | 12/1976 | Frush | 360/27 |
| 4,145,758 | 3/1979 | Drexler et al. | 369/54 |

FOREIGN PATENT DOCUMENTS

| | | | |
|---|---|---|---|
| 19924 | 12/1980 | European Pat. Off. | 369/54 |
| 55-113137 | 9/1980 | Japan | 369/54 |

OTHER PUBLICATIONS

Janus, Skip of Magnetic Tape Defective Area, IBM Tech Disclosure Bulletin, vol. 13, no. 6, 11/70, pp. 1413-1414.
Broadbent, A Review of the MCA Disco-Vision System, J. of the SMPTE, vol. 83, 7/74 pp. 554-559.

*Primary Examiner*—Stuart S. Levy
*Assistant Examiner*—Robert Weinhardt
*Attorney, Agent, or Firm*—Ronald J. Clark

[57] ABSTRACT

A method and apparatus for recording a data signal on a light-reflective record disc, wherein an intensity-modulated write beam of light is focused onto the disc as the disc is rotated in a prescribed fashion, to produce a sequence of spaced non-reflective regions representative of the data signal. Additionally, a relatively low intensity pre-write beam of light scans the disc in advance of, but synchronous with, the write beam to detect the presence of nonreflective defects in the disc that could inhibit the recording of the data signal thereon. Whenever such a defect is detected, a special defect flag code is recorded in advance of and over the defective region, whereby when the data signal is recovered from the disc at a subsequent time, it can be recognized that the data signal is being temporarily interrupted.

23 Claims, 3 Drawing Sheets

DATA SIGNAL FORMATTER (61)

METHOD AND APPARATUS FOR SCANNING A RECORDING MEDIUM FOR DEFECTS

This application is a continuation of Ser. No. 230,920 filed Feb. 2, 1981, now abandoned, which is a divisional of Ser. No. 045,112 filed June 4, 1979, now abandoned.

BACKGROUND OF THE INVENTION

This invention relates generally to devices for recording data on a record medium, and, more particularly, to devices for detecting defects in such a medium that would inhibit such recording.

Devices of this particular type are useful in systems for recording data, especially digital data, on magnetic or optical media, wherein defects in the magnetic material or optical surface can inhibit the recording of data thereon. It has been found desirable for the systems to include means for verifying that the desired data has been properly recorded or, alternatively, means for detecting defective regions on the recording medium prior to the recording of data thereon, so that such defective regions can be avoided in the recording process.

Systems in which the data is verified after being recorded are normally classified as "read-after-write" or "read-while-write" systems. In a system typical of this type, for recording data on an optical disc, the data is recorded in a series of circular and concentrically arranged tracks by an intensity-modulated write beam of light that is focused onto the disc as the disc is rotated at a prescribed angular velocity, such as a constant angular velocity or a constant linear velocity. Additionally, a read beam of light is directed at the portion of the disc in which data has just been written to produce a reflected beam that is modulated in intensity by the data actually recorded. This reflected beam is detected and compared to the data that was intended to be written, to verify that it was properly recorded on the disc. In the event that a recording error is detected, the incorrect data is appropriately flagged and a prescribed portion of the data is re-written.

One typical read-after-write optical disc recording system is described in an article written by George C. Kenney et al, entitled "An Optical Disk Replaces 25 Mag Tapes", published in *IEEE Spectrum*, February, 1979. Although such systems are generally effective in producing recording media from which data can be recovered with substantially no errors, they can sometimes make inefficient use of the available recording capacity, because a substantial portion of the data must ordinarily be re-written whenever errors in the recorded data are detected.

In systems that include means for detecting defective regions on the recording medium prior to the writing of data thereon, the entire medium is typically scanned initially and identification flags are recorded to indicate the location of any defective regions that are detected. After the entire medium has been scanned and any defects thereon flagged, data is then recorded on the non-defective regions of medium. Such systems have not proven entirely satisfactory, however, for a number of reasons, one being that two complete scans of the recording medium are required, one to detect defects and the other to record data. Additionally, in the case of optical discs, wherein the precise locations of the recording tracks are not determined until data is actually recorded, it is sometimes the case that the successive circumferential swaths of the disc that are scanned during the initial scanning to detect defects therein will not correspond exactly with the successive swaths that are scanned when recording. As a result it might be difficult to correlate the two scans and determine exactly when, during the recording scan, a portion of the disc previously determined to defective is being scanned.

It will be appreciated from the foregoing that there is a need for a method and apparatus for recording data on a record medium, wherein defects in the medium can be detected and the data recorded on non-defective portions thereof, without the need for performing two complete scans of the medium, and without the need for re-writing substantial portions of the data. The present invention fulfills this need.

SUMMARY OF THE INVENTION

Basically, the present invention is embodied in an improved appartus and a related method for recording a data signal on a record medium, wherein the signal is coupled to transducer means that scans the medium in a prescribed fashion, to record the signal therein. In accordance with the invention, the apparatus further includes defect detection means for scanning unrecorded portions of the record medium, in synchronism with the scanning by the transducer means, to detect the presence of defects in the surface of the medium that would inhibit the recording of data thereon, along with control means for uncoupling the data signal from the transducer means wherever it is determined that the transducer means is scanning such a defect. When it has been determined that the defective region is no longer being scanned, the data signal is again coupled to the transducer means. As a result, the recording of data on defective regions of the record medium is avoided and the recording efficiency is substantially improved.

More particularly, the apparatus of the present invention is especially suited for recording a data signal on an optically-reflective disc, wherein the transducer means operates to modulate the intensity of a write beam of light in accordance with the data signal, and a lens carriage for directing the modulated beam onto the disc, as the disc is rotated at a prescribed angular velocity. The intensity of the beam is alternately greater than and less than a predetermined threshold at which the portion of the disc on which the beam impinges becomes substantially non-reflective, and the carriage is moved in a radial fashion relative to the disc, whereby a succession of spaced, microscopic regions of non-reflectivity, arranged in substantially circular and concentric recording tracks, is formed thereon.

The lens carriage further operates to direct a relatively low intensity pre-write beam of light onto the disc, in advance of, but synchronous with, the write beam of light. This pre-write beam, which thus scans non-recorded portions of the disc, is reflected by the disc in accordance with the reflectivity of the disc at its point of impingement thereon. The reflected beam is monitored by the defect detection means, which produces a defect detect signal whenever a variation in the intensity of the beam indicates that it has encountered a non-reflective defect in the disc. Then, when the write beam is scanning a portion of the disc that is indicated by the defect detect signal to be defective, the data signal is uncoupled from the modulation means.

In a more detailed embodiment, the apparatus can include another relatively low-intensity beam of light for scanning non-recorded portions of the disc, at a location trailing the pre-write beam by a small amount. This additional beam is similarly reflected by the disc, and whenever the intensity of this reflected beam exceeds that of the reflected pre-write beam by more than a prescribed amount, it is determined that the pre-write beam has encountered a non-reflective defect on the disc and a defect detect signal is produced.

Although both the write and pre-write beam are directed at the disc via a common lens carriage, they can impinge on the disc at either the same or different radii. When the two beams are both scanning the disc at the same radius, with the pre-write beam leading the write beam by a prescribed amount, the data signal can be uncoupled from the modulation means a predetermined time after a defect is scanned by the pre-write beam and detected by the defect detection means. In general, this prescribed time must be less than the amount by which the pre-write beam leads the write beam.

In an alternative embodiment of the present invention, wherein the two beams scan the disc at a different radii, but again with the pre-write beam leading the write beam by a prescribed amount, such as one complete revolution of the disc, the location of each defect scanned by the pre-write beam and detected by the defect detect means can be stored in a suitable register. When such locations are subsequently scanned by the write beam, the data signal is uncoupled from the modulation means, as previously described.

In accordance with another aspect of the present invention, a special defect flag signal is coupled to the write beam modulator whenever it is determined that the write beam is scanning a defective portion of the disc, whereby when the data signal is recovered from the disc at a subsequent time, it can be recognized that the data signal is being temporarily interrupted. Once the write beam is again scanning a portion of the disc that has been determined to be non-defective, the data signal is again coupled to the modulation means for recording on the disc.

The lens carriage means can further operate to direct a substantially constant intensity read beam of light onto the disc at a location that trails the point of impingement of the write beam of light by a prescribed amount. This read beam of light is reflected by the disc in accordance with the recorded information, and the reflected beam can be suitably detected to verify that the data signal was properly recorded in the disc. In a more detailed aspect of the present invention, the reflected read beam is also utilized to detect the presence of any defect flag signal on the disc, whereby after the flag signal has been detected for a prescribed amount of time, it is determined that the write beam is no longer scanning a defect in the disc, and the data signal can be again coupled to the write beam modulation means, for recording on the disc.

Other aspects and advantages of the present invention will become apparent from the following description of the preferred embodiment, taken in conjunction with the accompanying drawings, which disclose, by way of example, the principles of the invention.

DESCRIPTION OF THE PREFERRED EMBODIMENTS

Figure 1:
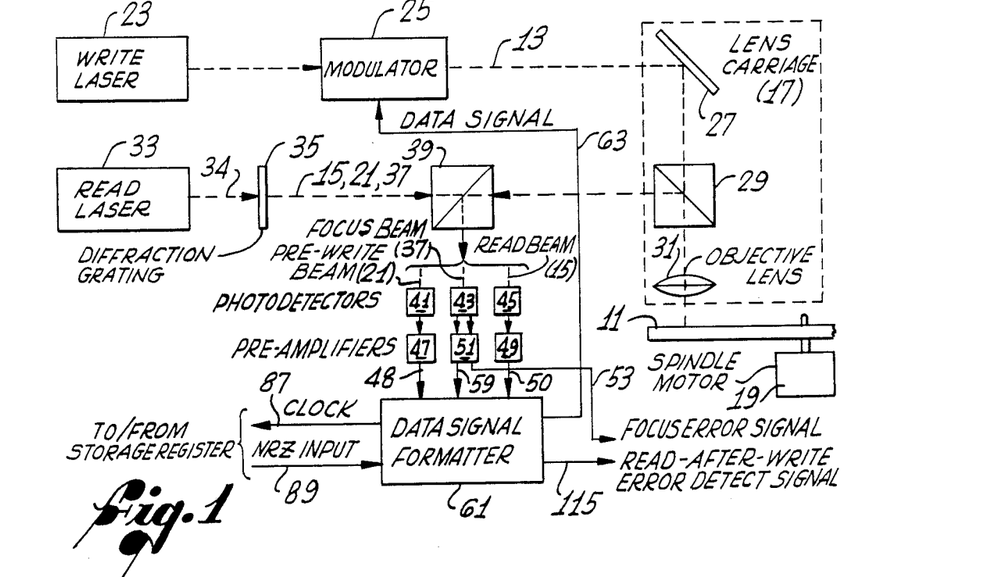
FIG. 1 is a simplified block diagram of a direct-read-after-write recording apparatus for detecting the presence of non-reflective defects on a light-reflective disc, and for recording a data signal only on the portions of the disc determined to be non-defective.

Referring now to the drawings, and particularly to FIG. 1 thereof, there is shown a direct-read-after-write recording apparatus for recording a digital data signal on a rotatable light-reflective disc 11. The apparatus operates to focus onto the disc a write beam of light 13 and a read beam of light 15, with the intensity of the write beam being modulated by the data signal such that it is alternately greater than and less than a predetermined threshold at which a substantially non-reflective microscopic pit is formed in a recording surface in the disc. The read beam of light, on the other hand, has a substantially constant intensity, below the threshold at which a pit is formed in the disc.

The apparatus includes a lens carriage 17 for slowly moving the respective points of impingement on the disc 11 of the write beam 13 and read beam 15, in a radial direction, as the disc is rotated at a prescribed angular velocity by a spindle motor 19, whereby a succession of substantially circular and concentrically arranged recording tracks is formed on the disc. Additionally, the radius of the point of impingement of the read beam on the disc is the same as that of the write beam, but it is arranged to scan each portion of the disc a prescribed amount of time after the write beam does. The read beam is reflected by the disc in accordance with the pattern of spaced, non-reflective pits produced by the write beam, and this reflected beam is detected in a conventional manner to verify that the data signal was properly recorded.

In accordance with the invention, the apparatus further operates to focus onto the disc 11 a substantially constant intensity pre-write beam of light 21 for scanning the disc in advance of the write beam 13 and detecting the presence of non-reflective defects in the disc that would inhibit the recording of information thereon, and the recording of the data signal is thereafter interrupted until it has been determined that the defect is no longer being scanned. Additionally, the apparatus operates to record a special defect flag signal slightly in advance of, and immediately over, the portions of the disc determined to be defective, so that when the data signal is recovered from the disc at a subsequent time using a playback or read machine, the machine can detect the flag and recognize that the data signal is being temporarily interrupted. By this technique, the re-writing of large blocks of information, which is ordinarily required when defects are detected by conventional direct-read-after-write systems, can be avoided, thereby substantially improving the recording efficiency of the apparatus.

More particularly, and as shown in FIG. 1, the write beam of light 13 is produced by a write laser 23 and is modulated in intensity by a modulator 25, such as a Pockels cell or an acoustic modulator. The modulated beam is then transmitted to the radially movable lens carriage 17, where it is reflected by a mirror 27, transmitted through a first beam splitter 29 and focused by an objective lens 31 onto the disc 11. The disc is rotated at a prescribed angular velocity by the spindle motor 19, while the lens carriage is moved radially relative to the disc, so that the succession of substantially circular and concentrically arranged recording tracks is formed.

The apparatus further includes a read laser 33 for producing a beam of light 34 that is transmitted to a diffraction grating 35, where it is diffracted into three separate and distinct beams, the read beam 15, the pre-write beam 21, and a focus beam 37. The primary beam produced by the grating is the read beam and it has a power level of about 35% of that of the non-diffracted beam, the first order beam is the focus beam and it has a power level of about 20% of that of the non-diffracted beam, and the second order beam is the pre-write beam and it has a power level of about 20% of that of the non-diffracted beam. The diffraction grating is suitably blazed to remove higher order beams and the first and second order beams on the other side of the primary beam.

The three beams 21, 37, and 15 are transmitted from the grating 35 through a second beam splitter 39 to the radially movable lens carriage 17, where they are reflected by the first beam splitter 29, and thereby combined with the write beam 13, and, in turn, focused by the objective lens 31 onto the disc 11. In the preferred embodiment of FIG. 1, the three diffracted beams and the write beam 13 are aligned with respect to each other and with respect to the disc so that they are all on a common radius, with the pre-write beam positioned approximately 25 microns in advance of the focus beam and 50 microns in advance of the read beam, and with the write beam positioned approximately 1 to 4 microns in advance of the read beam.

The pre-write beam 21, focus beam 37, and read beam 15 are all reflected by the disc 11 in accordance with the reflectivity of the disc at their respective points of impingement. Since both the pre-write beam and the focus beam are positioned in advance of the write beam 13 and thus scan unrecorded portions of the disc, their corresponding reflected beams ideally have a substantially constant intensity. The read beam, on the other hand, trails the write beam, so its reflected beam has an intensity that is modulated by the recorded information. All three reflected beams are collected by the objective lens 31, and, in turn, reflected by the first beam splitter 29 to the second beam splitter 39, where they are reflected and transmitted to three separate photodetectors 41, 43, and 45.

The photodetectors 41 and 45 for the reflected pre-write beam 21 and the reflected read beam 15, respectively, produce corresponding electrical signals proportional to the intensities of the respective beams. These two signals are suitably amplified in preamplifiers 47 and 49, to produce a pre-write signal and a read-after-write signal for output on lines 48 and 50, respectively.

The photodetector 43 for the reflected focus beam 37, on the other hand, includes two separate cells for producing a pair of electrical signals. These two signals are supplied to a focus beam preamplifier 51, where they are amplified and summed together to produce a sum signal representative of the overall intensity of the beam and subtracted from each other to produce a focus error signal indicative of the degree of focus for all of the beams. The focus error signal is output on line 53 for use in a focusing servo system (not shown). One suitable focusing servo system is disclosed in U.S. Pat. No. 4,152,586, issued in the name of James E. Elliott et al and entitled "Optical Transducer and Focusing System".

The pre-write and read-after-write signal outputs from the pre-write beam and read beam preamplifiers 47 and 49, respectively, and the sum signal from the focus beam preamplifier 51 are supplied over lines 48, 50, and 59, respectively, to a data signal formatter circuit 61. The circuit suitably processes the signals to detect non-reflective defects in the disc 11, and, additionally, appropriately formats the digital data signal for coupling over line 63 to the write beam modulator 25.

Figure 4:
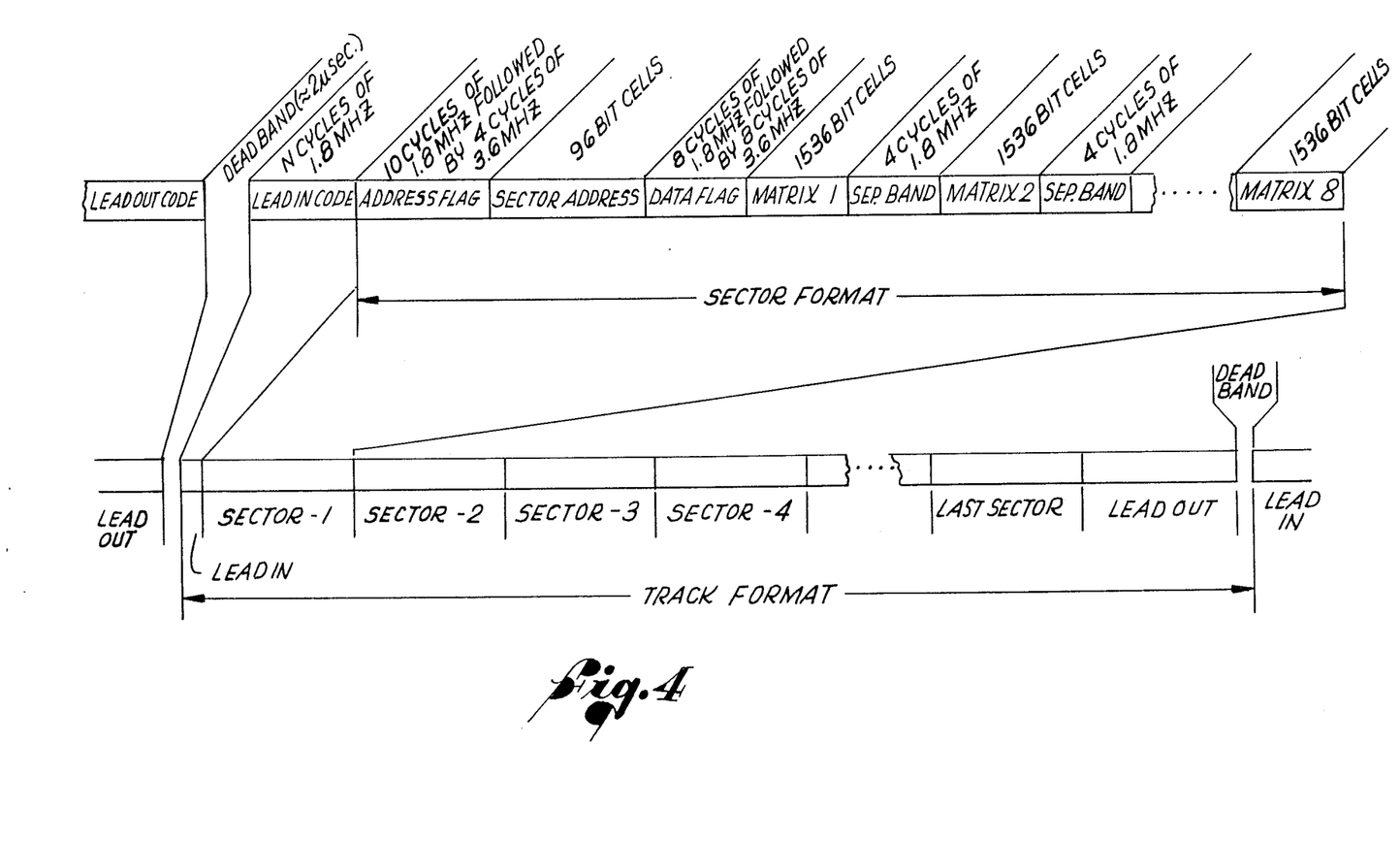
FIG. 4 is a schematic diagram, not to scale, showing the track and sector formats of the data signal recorded on each of the circular recording tracks on the disc.

Turning, for the moment, to a discussion of the format of the data signal to be recorded in each recording track on the disc 11, a simplified schematic diagram of this format, not to scale, is shown in FIG. 4. The format includes an initial lead-in code, followed by a plurality (normally about 24 to 28) contiguous data sectors, followed by a final lead-out code. Each data sector, in turn, includes a number of successive information segments, namely, an address flag code, a sector address code, and data from eight separate data matrices, separated from each other by a special separation band code.

Figure 5:
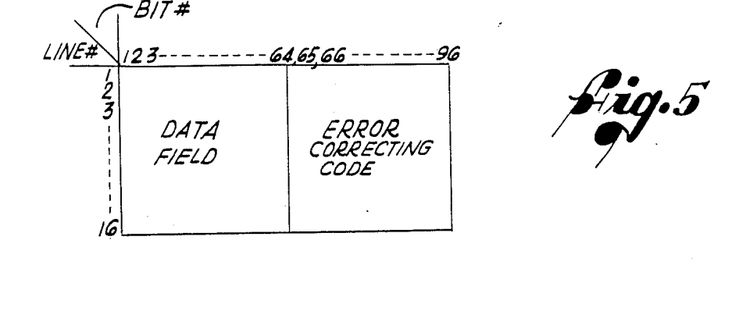
FIG. 5 is a diagram showing the organization of the data signal in each of eight data matrices in each track sector.

As shown in FIG. 5, each of the eight data matrices in each track sector includes 1536 bit cells, arranged in 16 rows of 96 bits each. The first 64 bits in each row comprise a data field, and the remaining 32 bits comprise a conventional error-correcting code that corrects for errors that might be made in the process of recovering the bits from the disc. The redundancy provided by 32 bits of error-correcting code in each row of the data matrix enables the correction of at least two bit errors per row. The data is initially entered into each matrix in a row-by-row fashion, but is output to the data signal formatter circuit 61, for encoding and eventual recording on the disc, in a column-by-column fashion. This interleaving ensures that the occurrence of burst errors, i.e., errors that occur in a number of successive bit cells on the disc, will not cause the error correcting capability of the 32-bit error-correcting code in each row to be exceeded. Thus, for example, if errors are made in recovering sixteen successive bits from the recorded disc, each incorrect bit will have necessarily originated in a different row in the matrix, and the capacity of the error correcting code for each row will not have been exceeded thereby.

In the preferred embodiment, all of the successive information segments in the track format have an overall 50% duty cycle, thereby facilitating a proper tracking of the recording tracks by a playback machine (not shown) for recovering the data. All of the various information segments are produced by an appropriate selection from three synchronous squarewave signals, having frequencies of 1.8 MHz, 3.6 MHz, and 7.2 MHz.

In particular, and as shown in FIG. 4, the lead-in code comprises a plurality of cycles from the 1.8 MHz signal, the address flag code comprises ten cycles of the 1.8 MHz signal followed by four cycles of the 3.6 MHz signal, the data flag comprises 8 cycles of the 1.8 MHz signal followed by eight cycles of the 3.6 MHz signal, and the separation band code comprises four cycles of the 1.8 MHz signal. Both the sector address segment of each sector and each of the eight data matrices for each sector are in a special fm format, wherein a "1" is represented by a complete cycle of the 7.2 MHz signal, and a "0" is represented by one-half cycle of the 3.6 MHz signal, with the phasing arranged such that there is always a level transition between each of the successive bit cells.

Figure 2:
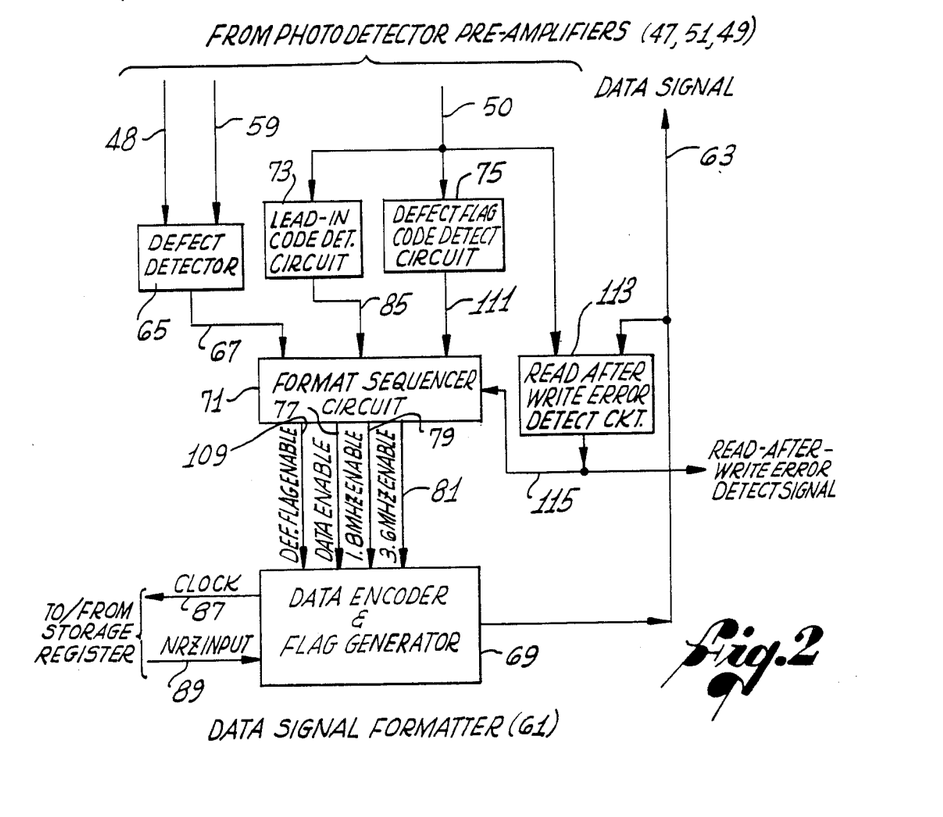
FIG. 2 is a more detailed block diagram of the data signal formatter in the recording apparatus of FIG. 1.
Figure 3:
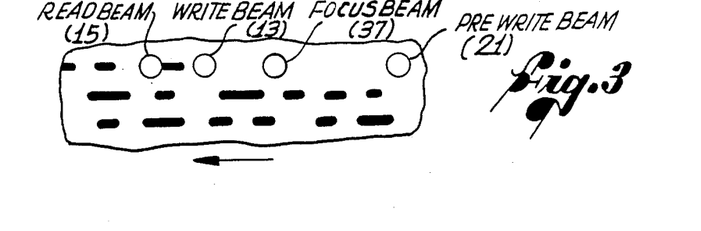
FIG. 3 is an enlarged schematic view of a portion of the recording disc of FIG. 1, showing the relative locations on the disc of a pre-write beam, a focus beam, a write beam, and a read beam.

Returning to a discussion of the data signal formatter circuit 61, which is shown in FIG. 2, the circuit includes a defect detector 65 for detecting non-reflective defects in the disc 11 by comparing the pre-write signal from the pre-write beam preamplifier 47 to the sum signal from the focus beam preamplifier 51. The detector 65 includes conventional differential amplifier and comparator circuits for sensing when the sum signal exceeds the pre-write signal by more than a prescribed amount. When this occurs, it is determined that the scan of the pre-write beam has encountered a non-reflective defect on the disc, and an appropriate defect detect signal is output on line 67. By making this comparison of the intensity of the reflected pre-write beam to that of the reflected focus beam rather than to a prescribed fixed threshold, variations in reflectivity that are gradual across a relatively large area on the disc and that, thus, will not unduly inhibit the recording of the data signal thereon, are not determined to be defects.

In an alternative embodiment of the apparatus, the defect detector 65 receives only the pre-write signal, and the detector includes conventional high-pass filter and threshold detector circuits to sense when rapid changes in the intensity of the reflected pre-write beam 21 are occurring. Such rapid changes normally occur whenever the beam is scanning the leading or trailing edge of a non-reflective defect in the disc 11. In similar fashion to the embodiment of FIG. 2, the defect detector produces a corresponding defect detect signal on line 67.

The data signal formatter circuit 61 further includes a data encoder and flag generator circuit 69 for producing the digital data signal that is transmitted over line 63 to the write beam modulator 25, a format sequencer circuit 71 for appropriately controlling operation of the data encoder 69, a lead-in code detection circuit 73, and a defect flag code detection circuit 75. The data encoder includes an oscillator that produces the aforementioned 1.8 MHz, 3.6 MHz, and 7.2 MHz square-wave signals, and, in normal operation, the specific frequencies, or their inverses, are selected for output as the data signal by a number of control signals supplied by the format sequencer. These control signals include a data enable signal, a 1.8 MHz enable signal, and a 3.6 MHz enable signal, all supplied over lines 77, 79, and 81, respectively. The format sequencer 71 includes a microprocessor for appropriately sequencing the control signals to produce the above-described data signal sequence (FIG. 4).

At the beginning of each track, it is determined that the lead-in code is to be recorded, so the 1.8 MHz enable signal is output by the format sequencer 71 on line 79. The data encoder and flag generator circuit 69 responds by connecting the 1.8 MHz squarewave signal for output on line 63 as the digital data signal, and the 1.8 MHz signal is recorded on the disc 11. The recorded 1.8 MHz code is detected by the lead-in code detection circuit 73, which is continuously monitoring the read-after-write signal supplied on line 50 by the read beam preamplifier 49. After the code has been detected for a prescribed number of cycles, preferably about eight cycles, a signal is output on line 85 to the format sequencer circuit 71 and the circuit, accordingly, begins outputting the appropriate enable signals for the next successive information sector, i.e., an address flag code. Specifically, for the address flag code, the sequencer circuit outputs initially a 1.8 MHz enable signal on line 79 for ten cycles, and then a 3.6 MHz enable signal on line 81 for four cycles.

In somewhat different fashion, when either a sector address code or data from one of the data matrices is to be recorded, the format sequencer 71 outputs a data enable signal on line 77, and the data encoder and flag generator 69 responds by outputting a clock signal on line 87 to clock an NRZ data input signal from an address and data storage register (not shown) for transmission over line 89 back to the generator. The generator 69 converts the NRZ signal to an fm format, in a conventional manner, to produce the appropriate data signal output. In the fm format, a "1" is represented by one complete cycle of the 7.2 MHz signal, and a "0" is represented by one-half cycle of the 3.6 MHz signal, with the phasing arranged such that there is always a transition in level between successive bit cells.

Figure 6:
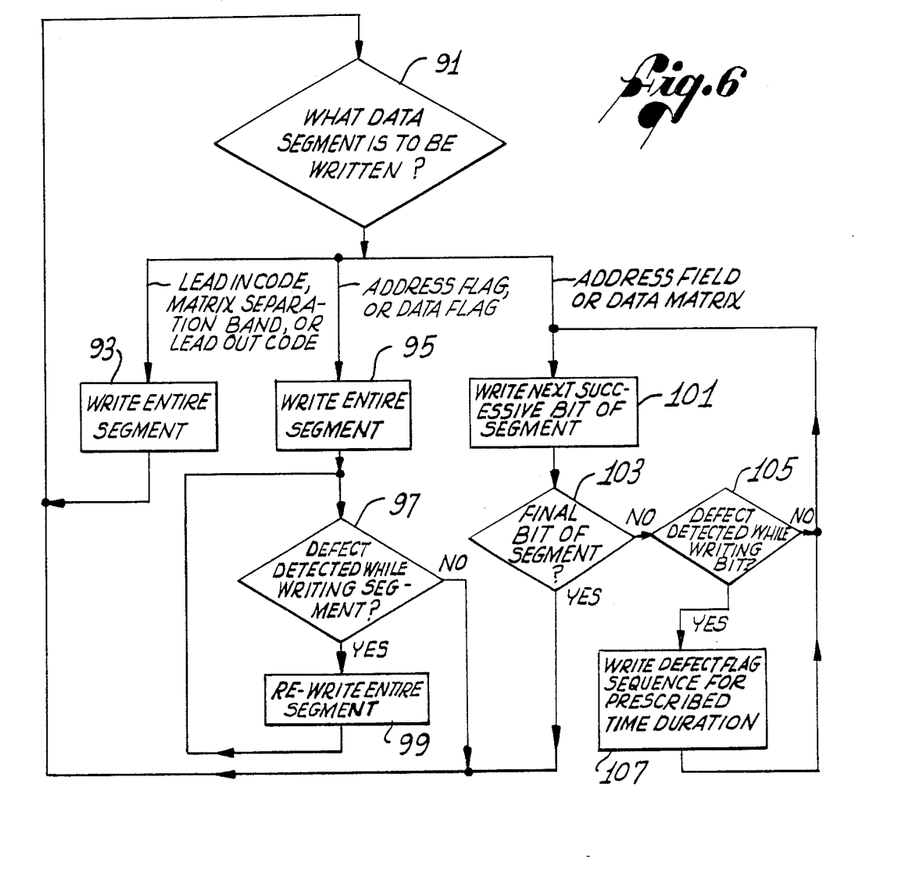
FIG. 6 is a flowchart showing, in simplified form, the operational steps performed by the apparatus of FIG. 1 in recording a data signal on the disc when defects are detected therein.

Turning now to a description of the data signal format when non-reflective defects are detected on the disc 11 by the defect detector circuit 65, reference is made to FIG. 6, wherein a flowchart is depicted showing, in simplified form, the successive steps performed by the data signal formatter 61 in formatting the information for recording on the disc 11. If a defect in the disc is detected by the defect detector, the particular procedure performed thereafter is dependent on the particular sector information segment currently being recorded.

Accordingly, it is determined at an initial step 91 what sector segment is to be recorded next on the disc. If either a lead-in code, a matrix separation band code, or a lead-out code is to be recorded, the entire code is recorded on the disc at step 93, and the output of the defect detector 65 is not monitored. A return is then made to the initial step 91, wherein it is determined what the next sector segment to be recorded is. If a recording error is made for these information segments because of a non-reflective defect in the disc, a playback machine for recovering the information will not be adversely affected thereby.

If it is determined in the initial step 91 that an address flag or data flag is to be recorded on the disc 11, the entire flag is recorded at step 95, after which it is determined at step 97 whether or not a defect was detected by the defect detector 65 while the flag was being recorded. If no defect was detected during that time, a return is made to the initial step 91, wherein it is determined what the next sector segment to be recorded is. If, on the other hand, it is determined at step 97 that a defect was detected while the address flag or data flag was being recorded, the entire flag is re-recorded at step 99 and a return is made to the step 97 to determine whether or not a defect was detected while the flag was being re-written. This process continues until it is determined that no defect was detected while the flag was being written.

If, on the other hand, it is determined at step 91 that a sector address field or a data field is to be recorded, the next successive bit of the segment is recorded at step 101, after which it is determined at step 103 whether or not the bit just recorded is the final bit of the field. If it was the final bit, a return is made to the initial step 91, wherein it is determined what sector segment is then to be recorded. If, on the other hand, it is determined at step 103 that the last-recorded bit is not the final bit in the field, it is determined at step 105 whether or not a defect was detected by the defect detector 65 while recording the bit. If a defect was not detected during such time, a return is made to the step 101, wherein the next successive bit of the field is recorded. If, on the other hand, it is determined that a defect was detected by the defect detector during such time, a special defect flag code is recorded on the disc until it is determined as step 107 that a prescribed number of error-free cycles have been recorded by the write beam 13 and scanned by the read beam 15. When this occurs, a return is made to the step 101 and the next successive bit of the field is recorded on the disc 11. The bit that was being written when the defect was first detected by the defect detector 65 need not be re-written, because the write beam 13 lags the prewrite beam 21 by a sufficient amount to ensure that the recording occurs on a defect-free portion of the disc.

In the preferred embodiment, the special defect flag code comprises two intial cycles of the 1.8 MHz square-wave signal, followed by a number of cycles of the 3.6 MHz square-wave signal. The 3.6 MHz signal is continued to be recorded on the disc until, by monitoring the reflected read beam 15, it is determined that 16 consecutive level transitions have been recorded and detected. This indicates that the nonreflective defect is no longer being scanned by the write beam 13. It will be appreciated that this unique sequence can be readily distinguished from the other information segments of the data signal recorded on the disc, and thus can be used effectively as a flag to indicate that the data signal is being temporarily interrupted.

Before resuming the recording of the data signal on the disc, however, it must first be determined whether an address field or a data matrix was being recorded. If an address field was being recorded at the time the defect was initially detected, the data encoder and flag generator 69 is thereafter appropriately controlled to output for recording four complete cycles of the 1.8 MHz signal, followed by a resumption of the address field information. On the other hand, if a data matrix was being recorded, the generator is thereafter controlled to output four cycles of the 1.8 MHz signal, followed by eight cycles of the 3.6 MHz signal and, in turn, a resumption of the data matrix information. This added code segment provides added assurance that the information can be properly recovered from the disc by a playback machine.

With reference again to FIG. 2, when it is determined by the format sequencer circuit 71 that a defect flag code is to be recorded on the disc 11, a defect flag enable signal is output on line 109 to the data encoder and flag generator circuit 69, which responds by generating the above-described code for transmission over line 63 to the write beam modulator 25. The defect flag code detection circuit 75 then continuously monitors the read-after-write signal supplied on line 50 from the read beam preamplifier 49, and produces a control signal for coupling over line 111 to the format sequencer circuit 71 when it has properly detected eight successive cycles of the 3.6 MHz portion of the defect flag code. The defect flag enable signal on line 109 is then terminated and the flag generator circuit 69 is sequenced through the above-described short code to complete the defect flag code and the recording of the data signal is then resumed.

It will be appreciated that, since the pre-write beam 21 scans the disc 11 about 45–50 microns in advance of the write beam 13, and since the writing of the defect flag code is initiated within one bit time of the instant at which the pre-write beam has encountered a non-reflective defect, it is generally the case that a number of cycles of the defect flag code are recorded on the disc before the write beam first encounters the defect. Thus, even if the defect inhibits completely the recording of the defect flag code thereon, the preceding cycles of the code will normally be detected by a playback machine recovering the information from the disc, and the machine will recognize that the data signal is being temporarily interrupted.

It will also be appreciated that if a detected defect in the disc 11 is particularly lengthy, the defect flag code will be correspondingly lengthy. Recording of the data signal is resumed only after the defect flag code has been properly recorded on the disc and recovered therefrom for the prescribed time duration. Such proper recording can ordinarily occur only on non-defective portions of the disc.

The data signal formatter 61 further includes a read-after-write error detection circuit 113 for monitoring the read-after-write signal supplied on line 50 from the read beam preamplifier 49. The circuit compares the signal, which is indicative of the information actually recorded on the disc 11, to the data signal on line 63 that was supposed to have been recorded, and it outputs a read-after-write error detect signal whenever the two signals do not correspond to each other.

The read-after-write error detect signal is coupled over line 115 from the read-after-write detection circuit 113 to the format sequencer circuit 71 and to the address and data storage register (not shown). If the error is detected while recording either a lead-in code, an address flag, a sector address, a data flag, a data matrix separation band code, or a lead-out code, the format sequencer circuit operates to record the entire code. On the other hand, if the error is detected while recording bits from a matrix, the matrix column currently being recorded is first completed, after which a data flag code is recorded and the recording of matrix data is resumed, with the two columns of data that were last-recorded being recorded again. This special re-recording sequence is performed because it can sometimes difficult to determine the exact bit cell that was being recorded when the read-after-write error was first detected.

In an alternative embodiment of the present invention (not shown in the drawings), the pre-write beam and the write beam impinge on the disc at different radii, e.g., one track spacing apart. This can be readily accomplished by an appropriate orientation of the diffraction grating. The apparatus of this embodiment includes a register for storing the circumferential location of each defect that is scanned by the pre-write beam, along with means for interrupting the recording of the data signal and recording in its place the special defect flag signal, as described above, whenever it is determined that the write beam is approaching one of the previously detected defects.

In another alternative embodiment of the present invention (also not shown in the drawings), the pre-write beam and the write beam impinge on the disc at the same radius, but each recording track is scanned on two consecutive revolutions of the disc. On the first revolution, the pre-write beam scans the disc to detect the presence and circumferential location of any defect in the track, and store the locations in a register. On the second revolution, the data signal is recorded on the track, with interruptions occurring, as appropriate, to record the special defect flag code, as previously described.

In this embodiment, the pre-write beam preferably also serves the function of the read beam, scanning the disc immediately behind the write beam during the alternate revolutions of the disc in which the data signal is being recorded. Although the use of this embodiment requires twice as much time to record a specified number of tracks, since each track is scanned for two revolutions of the disc, it obviates the need for a diffraction grating for producing a number of low-intensity beams and the need for a number of separate photodetectors and preamplifiers.

From the foregoing description, it should be apparent that the present invention provides an improved method and apparatus for recording a data signal on a recording medium. Defects in the medium that could inhibit the recording of the data signal thereon are scanned and detected immediately in advance of a transducer for recording the signal. When such a defect is detected, the recording of the data signal is temporarily interrupted and a special defect flag code is recorded in its place, in advance of, and directly over, the defective region on the medium. As a result, the re-writing of substantial portions of the data signal can be avoided.

While a particular form of the invention has been illustrated and described, it will be understood by one of ordinary skill in the art that various modifications can be made, without departing from the spirit and scope of the invention. Accordingly, it is not intended that the invention be limited, except as by the appended claims.

I claim:

1. Apparatus for recording a data signal on a light-reflective disc, comprising:
    means for producing a write beam of light;
    means for modulating the intensity of said write beam of light, in accordance with the data signal;
    optical means including a source of light for producing a pre-write beam of light, and means for directing at the disc both said pre-write beam of light and the intensity-modulated write beam of light, said write beam having a peak intensity sufficiently high to modify the reflectivity of the disc at its point of impingement thereon, said pre-write beam having an intensity sufficiently low that it is reflected by the disc in accordance with the reflectivity of the disc at its point of impingement thereon, the reflectivity of the disc not being affected thereby;
    means for rotating the disc relative to the pre-write and write beams, whereby the rotating disc is impinged simultaneously by both beams and the data signal is recorded on the disc by said write beam thereby forming a recording track therein;
    said optical means including means for positioning the pre-write beam and the write beam relative to each other such that the pre-write beam leads the write beam by a prescribed amount and falls on a non-recorded region of the disc ahead of said write beam;
    defect detection means for monitoring the intensity of the reflected pre-write beam in accordance with the reflectivity of the disc at the point of impingement of the pre-write beam thereon, and for determining when a defect on the disc affecting its reflectivity is being impinged and producing a corresponding defect detect signal; and
    control means, responsive to the defect detect signal, for uncoupling the data signal from said modulating means, whereby the recording of the data signal on the disc is interrupted each time a defect is encountered and in advance of the defect reaching the point of impingement of the write beam.

2. Apparatus as defined in claim 1, wherein said control means further includes means operable to couple a special defect flag signal to said modulating means whenever the defect detect signal is present, whereby a marker is recorded on the disc in advance of the location of each detected defect.

3. Apparatus as defined in claim 2, wherein said control means includes means operable to uncouple the data signal from said modulating means after a prescribed time has elapsed following detection of a defect in the disc by said defect detection means.

4. Apparatus as defined in claim 2, wherein:
    said optical means further includes a source of reading light for producing and directing at the disc a read beam of light having intensity sufficiently low that the reflectivity of the disc is not affected thereby, the read beam being positioned a prescribed distance behind the write beam, said disc producing a reflected read beam having an intensity modulated by the recorded signal; and
    said defect detection means includes means for sensing whenever the reflected read beam has been intensity modulated by the defect flag signal, and for terminating the defect detect signal whenever a defect flag signal has been sensed for a prescribed time.

5. Apparatus as defined in claim 4, wherein said optical means includes means for producing a source beam of light, and wherein both the pre-write beam and the read beam are produced by passing said source beam of light through a diffraction grating.

6. Apparatus as defined in claim 1, wherein:
    said optical means includes means operable to move the respective points of impingement of said pre-write beam and said write beam on the disc in a radial direction, whereby a plurality of substantially circular and concentrically arranged recording tracks are formed on the disc; and
    said optical means further includes means operable to position said pre-write beam and said write beam with respect to each other such that they both scan the same recording track simultaneously.

7. Apparatus as defined in claim 1, wherein;
    said optical means includes means operable to move the respective points of impingement of said pre-write beam and said write beam on the disc in a radial direction, whereby a plurality of substantially circular and concentrically arranged recording tracks are formed on the disc;
    said optical means further includes means operable to position said pre-write beam and said write beam at different radii on the disc, whereby the pre-write beam scans each track at least one revolution of the disc before the write beam does; and
    said control means includes means for storing the circumferential location on the disc of any defects detected by said defect detection means.

8. Apparatus as defined in claim 1, wherein:

said optical means further includes means operable to produce and direct at the disc a focus beam of light, having an intensity sufficiently low that the reflectivity of the disc is not affected thereby, wherein the focus beam is positioned to scan the disc in advance of the write beam, and wherein the focus beam is reflected by the disc in accordance with the reflectivity of the disc at its point of impingement thereon; and said defect detection means further includes means operable to monitor the reflected focus beam, and to produce a defect detect signal whenever the intensity of the reflected focus beam exceeds that of the reflected pre-write beam by more than a prescribed amount.

9. Apparatus as defined in claim 1, wherein:

said optical means includes means operable to move the respective points of impingement of said pre-write beam and said write beam on the disc in a radial direction, whereby a plurality of substantially circular and concentrically arranged recording tracks are formed on the disc;

said optical means further includes means operable to position said pre-write beam and said write beam with respect to each other such that each recording track is scanned first by the pre-write beam and then by the write beam, on alternate revolutions of the disc; and said control means includes a register for storing a measure of each circumferential location on the disc where the defect detect signal is produced, and means, operable on the next successive revolution of the disc, for uncoupling the data signal from said modulating means and coupling in its place the defect detect signal whenever the write beam is scanning a circumferential location on the disc previously determined to be defective.

10. Apparatus as defined in claim 9, wherein:

said control means further includes means operable to uncouple the data signal from said modulating means on alternate revolutions of the disc, when the pre-write beam is scanning the disc to detect the presence of defects therein, and on alternate revolutions of the disc, when the data signal is being recorded therein, to utilize the pre-write beam to scan the disc at a location trailing the write beam, to verify that the data signal was properly recorded on the disc.

11. Apparatus as defined in claim 1, wherein said defect detection means includes a high-pass filter for sensing rapid variations in the intensity of the reflected pre-write beam of light, and a threshold detector for producing the defect detect signal whenever the magnitude of a sensed rapid variation exceeds a prescribed threshold.

12. Apparatus for recording a data signal on a light-reflective disc, comprising:

means for modulating the intensity of a write beam of light, in accordance with the data signal;

means for diffracting a beam of light having a substantially constant intensity to produce a pre-write beam of light and a read beam of light;

carriage means for directing at the disc the pre-write beam of light, the read beam of light, and the intensity-modulated write beam of light, said write beam having a peak intensity sufficiently high to modify the reflectivity of the disc at its point of impingement, said pre-write beam and said read beam having intensities sufficiently low that they are reflected by the disc in accordance with the reflectivity of the disc at their respective points of impingement thereon, the reflectivity of the disc not being affected thereby;

means for rotating the disc relative to the pre-write, read, and write beams, whereby the disc is scanned by all three beams;

said carriage means operating to position the pre-write beam, the read beam, and the write beam relative to each other such that the pre-write beam leads the write beam by a prescribed amount and the read beam trails the write beam by a prescribed amount, whereby the reflected pre-write beam has an intensity indicative of the reflectivity of the disc at a location immediately in advance of the write beam, and whereby the reflected read beam has an intensity indicative of the signal recorded on the disc by the write beam;

said carriage means further operating to move in a radial direction relative to the disc, whereby the data signal is recorded in the disc in a plurality of substantially circular and concentrically arranged recording tracks;

defect detection means for monitoring the reflected pre-write beam and for producing a defect detect signal whenever the intensity of the reflected beam is less than a prescribed threshold, said signal indicating that a non-reflective defect on the disc is being scanned by the pre-write beam; and control means, responsive to the defect detect signal, for selectively uncoupling the data signal from said modulating means and for coupling in its place a defect flag signal, whereby a marker is recorded on the disc at a location immediately in advance of each defect detected therein;

said defect detection means further including means for monitoring the reflected read beam and for terminating the defect detect signal when the intensity of the beam has been modulated by the defect flag signal for a prescribed time duration, whereupon said control means operates to again couple the data signal to said modulating means for recording on the disc.

13. Apparatus as defined in claim 12, wherein:

said diffracting means further operates to produce a focus beam of light, located intermediate the pre-write beam of light and the read beam of light;

said carriage means further operates to direct the focus beam at the disc, said focus beam being positioned such that it leads the write beam by a prescribed amount, and said focus beam having an intensity sufficiently low that it is reflected by the disc in accordance with the reflectivity at its point of impingement thereon, the reflectivity of the disc not being affected thereby;

said defect detection means further operates to monitor the reflected focus beam, producing the defect detect signal whenever the intensity of the reflected focus beam exceeds that of the reflected pre-write beam by more than a prescribed amount.

14. Apparatus for recording a data signal on a moving record medium comprising:

recording transducer means for recording the data signal on the medium by forming a recording track therein;

defect detection means for scanning the record medium on a non-recorded region of the disc without affecting the recording characteristics thereof, in advance of said recording transducer means, and for detecting the presence of defects in the medium at the location of said defect detection means that would inhibit proper recording of a signal thereon subsequently by said recording transducer, the defect detection means further functioning to produce a defect detect signal, whenever a defect is detected;

control means, responsive to the defect detect signal, for selectively uncoupling the data signal from said recording transducer means and coupling a special defect flag signal to said recording transducer means, whereby the defect flag signal is recorded on the medium at a location immediately in advance of each detected defect;

said control means further functioning to uncouple the defect flag signal from said recording transducer means and recouple the data signal to said recording transducer means after the defect detect signal is terminated, whereby recording of the data signal on a non-defective region of the record medium is resumed; and means for scanning the record medium at a location trailing that of said recording transducer means by a prescribed amount for detecting the end of each defect and for thereafter terminating the defect detect signal.

15. Apparatus for recording a data signal on a moving record medium comprising:

recording transducer means for recording the data signal on the medium by forming a recording track therein;

defect detection means for scanning the record medium on a non-recorded region of the disc without affecting the recording characteristics thereof, in advance of said recording transducer means, and for detecting the presence of defects in the medium at the location of said defect detection means that would inhibit proper recording of a signal thereon subsequently by said recording transducer, the defect detection means further functioning to produce a defect detect signal wherever a defect is detected;

control means, responsive to the defect detect signal, for selectively uncoupling the data signal from said recording transducer means and coupling a special defect flag signal to said recording transducer means, whereby the defect flag signal is recorded on the medium at a location immediately in advance of each detected defect;

said record medium being a rotatable lightreflective disc;

said recording transducer means including means for providing a beam of light, means for modulating the intensity of the beam of light in accordance with the signal to be recorded, and means for directing the intensity-modulated beam of light at the disc as the disc is rotated in a prescribed fashion, whereby a succession of spaced, non-reflective regions is formed on the disc, in accordance with the signal to be recorded; and the defect detection means including means for directing at the disc a relatively lowintensity beam of light, whereby a reflected beam of light is produced having an intensity that varies according to the reflectivity of the disc, and means for monitoring the reflected beam of light and producing the defect detect signal whenever the intensity of the reflected beam is below a prescribed threshold.

16. Apparatus for recording a data signal on a moving recorded medium, comprising:

recording transducer means for recording the data signal on the medium by forming a recording track therein; defect detection means including pre-record scanning means for scanning the the record medium, without affecting the recording characteristics thereof, in advance of said recording transducer means, to detect the presence of defects in the medium at the location of said defect detection means that would inhibit proper recording of a signal thereon subsequently by said recording transducer, the pre-record scanning means further functioning to initiate a defect detect signal whenever a defect is first detected, and post-recording means for scanning the record medium behind said recording transducer means, and determining when a defect is no longer being scanned by said recording transducer means, and for thereafter terminating the defect detect signal; and control means responsive to the defect detect signal, for selectively uncoupling the data signal from said recording transducer means, whereby the recording of the data signal on the record medium is temporarily interrupted whenever a defect in the medium is detected.

17. Apparatus as defined in claim 16, wherein the control means further operates to couple a special defect flag signal to said recording transducer means whenever the defect detect signal is present, whereby the defect flag signal is recorded on the record medium at the location of each detected defect.

18. Apparatus as defined in claim 17, wherein the post-recording means detects the signal recorded on the medium by said recording transducer means and makes the determination that a defect is no longer being scanned by the transducer means after the defect flag signal has been detected for a prescribed time duration.

19. A method for recording a data signal on a previously unrecorded moving record medium, comprising steps of:

recording the data signal on the moving record medium with a recording transducer means:

scanning the record medium, without affecting the recording characteristics thereof, in advance of the recording transducer means, to detect the presence of defects in an unrecorded area of the medium that would inhibit proper subsequent recording of a signal thereon, and producing a defect detect signal whenever a defect is detected;

selectively uncoupling the data signal from the recording transducer means and coupling a special defect flag signal to the recording transducer means, in accordance with the defect detect signal, whereby the defect flag signal is recorded on the medium at a location immediately in advance of each detected defect;

uncoupling the defect flag signal from said recording transducer means and recoupling the data signal to said recording transducer means after the defect detect signal is terminated, whereby recording of the data signal on a non-defective region of the record medium is resumed; and scanning the record medium at a location trailing that of said recording transducer means by a prescribed amount, to detect the end of each defect, and thereafter terminating the defect detect signal.

20. A method for recording a data signal on a previously unrecorded moving record medium, comprising steps of:

recording the data signal on the moving record medium with a recording transducer means;

scanning the record medium, without affecting the recording characteristics thereof, in advance of the recording transducer means, to detect the presence of defects in an unrecorded area of the medium that would inhibit proper subsequent recording of a signal thereon, and producing a defect detect signal whenever a defect is detected;

selectively uncoupling the data signal from the recording transducer means and coupling a special defect flag signal to the recording transducer means, in accordance with the defect detect signal, whereby the defect flag signal is recorded on the medium at a location immediately in advance of each detected defect;

the record medium being a rotatable lightreflective disc;

the step of recording with said recording transducer means includes steps of providing a beam of light, modulating the intensity of the beam of light in accordance with the signal to be recorded, and directing the intensity-modulated beam of light at the disc as the disc is rotated in a prescribed fashion, whereby a succession of spaced, non-reflective regions is formed on the disc, in accordance with the signal to be recorded; and the step of scanning in advance of said recording transducer means includes steps of directing at the disc a relatively low-intensity beam of light, whereby a reflected beam of light is produced having an intensity that varies according to the reflectivity of the disc, and monitoring the reflected beam of light and producing the defect detect signal whenever the intensity of the reflected beam is below a prescribed threshold.

21. A method for recording a data signal on a previously unrecorded moving record medium, comprising steps of:

recording the data signal on the moving record medium with a recording transducer means;

scanning the record medium, without affecting the recording characteristics thereof, in advance of the recording transducer means, to detect the presence of defects in an unrecorded area of the medium that would inhibit proper subsequent recording of a signal thereon, and initiating a defect detect signal whenever a defect is first detected;

scanning the record medium behind the recording transducer means, to determine when a defect has passed the recording transducer means, and thereafter terminating the defect detect signal; and selectively uncoupling the data signal from the recording transducer means, in accordance with the defect detect signal, whereby the recording of the data signal on the record medium is temporarily interrupted whenever a defect in the medium is detected.

22. A method as defined in claim 21, and further including a step of coupling a special defect flag signal to the recording transducer means whenever the defect detect signal is present, whereby the defect flag signal is recorded on the record medium at a location immediately in advance of each detected defect.

23. A method as defined in claim 22, wherein in the step of scanning the record medium behind the recording transducer means, the signal recorded on the medium by the recording transducer means is detected and the determination that a defect is no longer being scanned by the transducer means is made after the defect flag signal has been detected for a prescribed time duration.

* * * * *